United States Patent [19]

Roider

[11] 3,724,884
[45] Apr. 3, 1973

[54] DRIVEN MEMBER LOCKING DEVICE

[75] Inventor: Richard Harden Roider, Poughkeepsie, N.Y.

[73] Assignee: Lundquist Tool and Manufacturing Co., Inc., Worcester, Mass.

[22] Filed: Jan. 26, 1972

[21] Appl. No.: 220,975

[52] U.S. Cl..............................287/52.08, 287/DIG. 8
[58] Field of Search.....F16d/1/06; 287/52.07, 52.08, 287/52.09, DIG. 8; 308/236

[56] References Cited

UNITED STATES PATENTS

| | | | |
|---|---|---|---|
| 3,294,459 | 12/1966 | Howe, Jr. | 287/52.09 X |
| 1,835,991 | 12/1931 | Runge | 308/236 |
| 2,553,337 | 5/1951 | Shafer | 85/1 SS |
| 385,122 | 6/1888 | Kromer | 287/52.07 X |
| 827,267 | 7/1906 | Schmidt | 287/52.09 |

Primary Examiner—Andrew V. Kundrat
Attorney—Carlton B. Fitchett

[57] ABSTRACT

The hub of a driven member is provided with a longitudinal bore therethrough having a slide fit with the drive shaft on which it is mounted and is further provided with a set screw arranged perpendicularly to the drive shaft and having a hardened serrated shank end set in tight engagement with the drive shaft. In addition, the driven member hub is provided with an eccentric counterbore at one end thereof and the counter bore is undercut to form a sharp edge. The device also includes a locking ring or collar that is likewise provided with a bore therethrough having a slide fit to the drive shaft. The collar also has an eccentric shoulder formed on an end face thereof, the shoulder being complementary to the eccentric counterbore in the hub and receivable therein. The collar is also provided with means through which the collar may be rotated while the complementary eccentric surfaces are in engagement thereby to rock the driven member axially relative to the drive shaft and drive the set screw serrations into the body of the drive shaft. While the collar is being rotated, the sharp edge formed by the undercutting of the hub eccentric bore cuts a crude thread form in the surface of the collar's eccentric shoulder thus firmly securing the shoulder within the hub counterbore.

3 Claims, 6 Drawing Figures

PATENTED APR 3 1973 3,724,884

DRIVEN MEMBER LOCKING DEVICE

This invention relates to locking means for securing a driven member to a drive shaft.

The locking device according to the subject invention permits making repairs to farm machinery, and the like, in the field with a minimum of tools. In heretofore known arrangements, a driven member such as a gear or pulley is usually secured to a drive shaft by either one or more set screws or a locking collar. In the invention herein disclosed, the driven member hub is provided with a set screw having a hardened serrated shank end, and an eccentric counterbore is formed in the hub. The hub counterbore accepts a complementary eccentric surface formed on the locking collar and, in addition, is provided with an undercut. With this arrangement as described in detail hereinafter, the advantages of both methods of securement work together to provide a firm vibration-proof means of engagement for a driven member and its associated drive shaft.

In the arrangement according to the present invention, the locking ring or collar is provided with means on the periphery thereof by means of which it may be rotated into a locking position by the use of a punch and hammer, or a spanner, and the exposed end of the set screw is provided with a head or other means that may be gripped by any usual type of wrench. All three of these tools are usually found about farm machinery thus permitting repairs to be made in the field.

It is therefore the principle object of this invention to provide a novel vibration proof locking means for securing a driven member to a drive shaft.

Another object is to provide locking means that is simple, cheap to manufacture and effective in use.

A more clear conception of the operation, construction and further objects of the invention may be had from the following specification when read in the light of the attached drawings in which.

Figure 1:
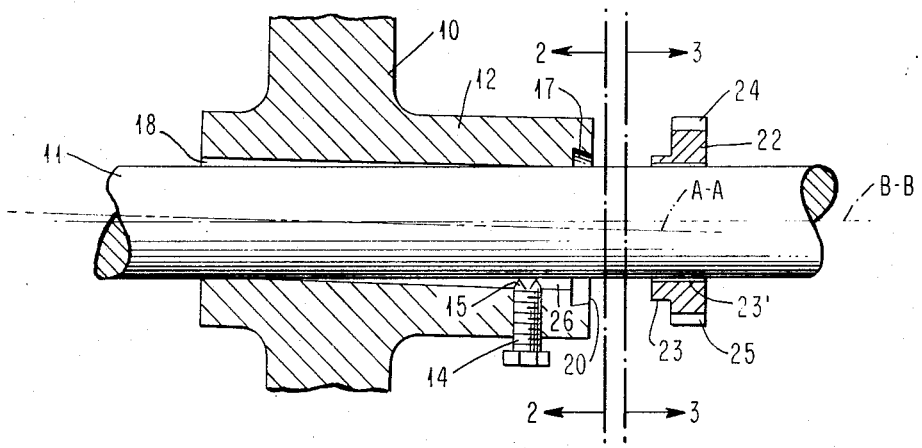
FIG. 1 is an exploded view partly in cross section through a driven member and locking ring according to the present invention showing the relation between the driven member and its associated set screw, and the drive shaft and locking ring in their respective unlocked positions.

Referring now to the drawings, a pulley, gear or other driven member 10 is provided with a slide fit on shaft 11 and has a hub 12 in which is located a set screw 14. The set screw is formed with the usual threads and a driving head, and the hardened shank end thereof has one or more serrations 15 formed thereon.

Figure 2:
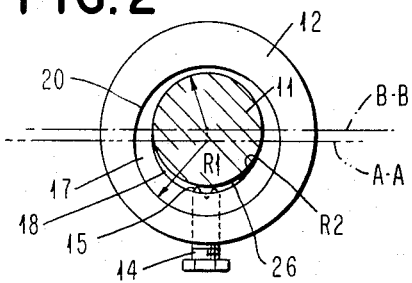
FIG. 2 is an end view taken along line 2—2 of FIG. 1 of the hub portion of the driven member.
Figure 3:
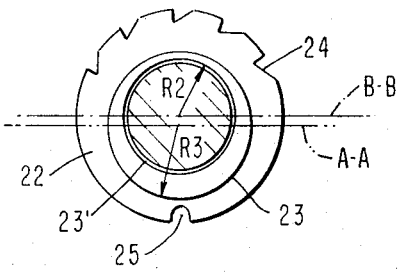
FIG. 3 is an end view taken along line 3—3 of FIG. 1 of the locking ring arranged for assembly within the hub.

One end of the hub 12 is counterbored to form a bore 17 larger than the central bore 18 of the driven member hub. The bore 17 is eccentric to bore 18 as indicated at R1–R2 (FIG. 2) and bore 17 is undercut to form a sharp lip 20 as shown in FIG. 1. The set screw 14 is located approximately 180° from the low point of eccentricity of the bore 17.

A locking ring or collar 22, adapted to fit shaft 11 with a slide fit, has a shoulder 23, the outer peripheral surface of which is eccentric to the bore 23' of the collar as indicated by R3–R2. Both the outer peripheral surface of shoulder 23 and the bore 17 have the same degree of eccentricity.

The periphery of collar 22 is provided with notches 24 and a positioning indicia, here shown as an arcurate cut out 25. The arcurate cut out 25 is located in the same relation to the low point of eccentricity of the shoulder 23 as the set screw 14 bears to bore 17. With the cutout 25 in alignment with set screw 14, both shoulder 23 and bore 17 are so positioned that the shoulder 23 may be inserted within in the bore 17 when the collar and hub are moved together axially along shaft 11.

To secure the member 10 to the shaft 11, member 10 is arranged on the shaft 11 at a desired location and the set screw 14 is set up as far as it will go without undue pressure with a suitable driving tool. This will rock the member 10 into the position indicated by the axial dot-dot dash line A—A with relation to the center line of shaft 11 indicated by dot dash line B—B. This will open a slight gap 26 (FIG. 2) between the shaft 11 and the bore 18 of the driven member 10. The collar 22 is now placed on the shaft 11 with its cutout 25 and the set screw 14 of hub 12 aligned as noted above and slid therealong until its shoulder 23 enters into the counterbore 17. The collar 22 is then turned clockwise until tight using a punch and hammer, or a spanner wrench, acting through the notches 24. The sharp lip 20 of bore 17 will cut into the shoulder 23 as the collar 22 is turned clockwise thus forming a crude thread form which draws the collar 22 axially into the bore 17 and the friction so created firmly secures the collar within that bore. As the eccentric surfaces of the bore 17 and shoulder 23 engage, the clockwise rotation of collar 22 will axially rock the center line A—A of the bore 18 of member 10 about the set screw serrations 15 as a fulcrum (see FIG. 4) toward alignment with the center line B—B of the shaft 11. Continued clockwise rotation of the collar 22 will create sufficient pressure along the central longitudinal axis of the set screw 14 to drive its hardened serrations 15 into the body of the shaft 11. This action positively locks the driven member 10 to the shaft 11 and also locks the set screw against being loosened by vibration since it is held from turning by the serrations being pressed directly into the shaft surface.

Figure 4:
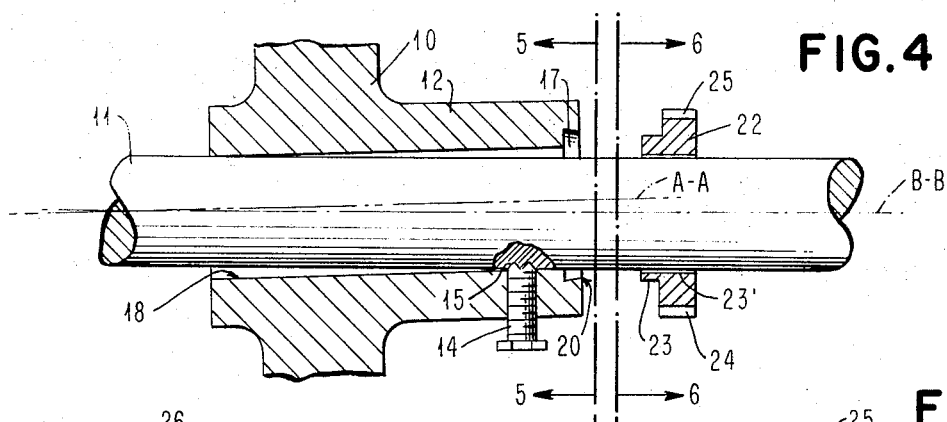
FIG. 4 is an exploded view partly in cross section similar to FIG. 1 showing the driven member and its associated set screw, and the drive shaft and locking ring in their respective locked positions.
Figure 5:
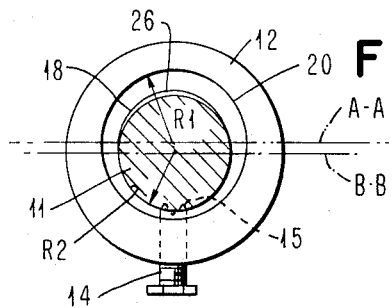
FIG. 5 is an end view similar to FIG. 2 taken along line 5—5 of FIG. 4.
Figure 6:
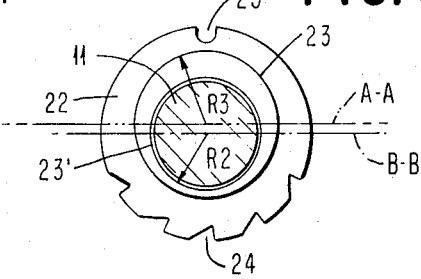
FIG. 6 is an end view similar to FIG. 3 taken along line 6—6 of FIG. 4.

It will be understood, of course, that FIGS. 1 and 4 of the drawing show greatly exaggerated differences between the radii R1, R2 and R3 so that the movement of both the driven member and the collar relative to the drive shaft may be clearly shown. In actual practice R1 and R3 vary only 0.003 to 0.007 inch from R2.

To unlock the member from the shaft, the collar is driven in a counterclockwise direction using a punch and hammer, or spanner wrench, to the position wherein the set screw 15 in the hub is in alignment with the arcuate cut out 25 in the collar as previously noted. With the respective parts returned to this aligned position, the hub and collar are readily separable, and the hub may be removed from the shaft by loosening the set screw.

I claim:

1. In combination, a drive shaft, a driven member arranged on the drive shaft and including a hub portion having a central bore, the interior diameter of which is slide fit to the drive shaft, a screw having serrations on the shank end thereof threaded in said hub with said screw serrations set in tight engagement with said shaft, an eccentric counterbore in one end of said hub, said counterbore having the sides thereof undercut to form a sharp cutting edge, and a locking collar having a bore therethrough which is slide fit to the drive shaft, said collar having a straight cylindrical shoulder formed on one end face complementary in eccentricity to said eccentric counterbore and receivable therein, the collar also including tool receiving means through which the said collar may be rotated while the straight shoulder thereof is within and in engagement with the complimentary eccentric counterbore of said driven member hub to rock said driven member axially relative to said drive shaft whereby said serrations on said screw are driven into the surface of said drive shaft to form a vibration-proof connection between said driven member and drive shaft.

2. The combination according to claim 1 wherein during rotation of said collar, the said sharp cutting edge of the hub counterbore cuts a crude thread form upon the straight cylindrical shoulder of the collar whereby said collar shoulder is secured within said hub counterbore.

3. In a locking device for a driven member adapted to be arranged on a drive shaft with a slide fit, said driven member having a hub fitted with a threaded screw having serrations on the shank end thereof and adapted to be set in tight engagement with the shaft when the driven member is arranged thereon, the hub also having an eccentric counterbore in one end thereof the sides of which being undercut and forming a sharp cutting edge, a locking collar adapted to be arranged on the same shaft with a slide fit and adjacent said hub, said collar having a straight cylindrical shoulder formed on one end face complementary in eccentricity to said eccentric counterbore and receivable therein, the collar also including tool receiving means through which the said collar may be rotated clockwise relative to the driven member while the straight cylindrical shoulder thereof is within and in engagement with the complimentary eccentric counterbore of said driven member hub to rock said driven member axially relative to the drive shaft on which it is arranged whereby said serrations on said screw are driven into the surface of said drive shaft thereby forming a vibration-proof connection between said driven member and drive shaft.

* * * * *